United States Patent [19]

Hsu

[11] Patent Number: 5,235,906

[45] Date of Patent: Aug. 17, 1993

[54] VEGETABLE DEHYDRATOR

[75] Inventor: Tony Hsu, Yung Kang Hsiang, Taiwan

[73] Assignee: Lundar Electric Ind. Co., Ltd., Tainan Hsien, Taiwan

[21] Appl. No.: 992,729

[22] Filed: Dec. 18, 1992

[51] Int. Cl.$^5$ .......................... A23L 3/16; F26B 3/16; F26B 21/06; F26B 23/06

[52] U.S. Cl. ......................... 99/483; 34/196; 34/197; 99/476; 126/21 A; 219/386; 219/400

[58] Field of Search .......... 99/467, 476, 483, 473–475; 34/195–197, 192, 211, 225; 126/21 A; 219/385–387, 400, 521; 312/236

[56] References Cited

U.S. PATENT DOCUMENTS

| 208,925 | 10/1878 | Powers | 34/197 |
| 1,893,694 | 1/1933 | Bohmker | 219/400 |
| 3,943,842 | 3/1976 | Bills et al. | 99/473 |
| 4,065,857 | 1/1978 | Nelson et al. | 99/483 |
| 4,110,916 | 9/1978 | Bemrose | 99/483 |
| 4,190,965 | 3/1980 | Erickson | 34/196 |
| 4,236,063 | 11/1980 | Glucksman | 126/21 A |
| 4,380,127 | 4/1983 | Roberts | 99/483 |
| 4,503,627 | 3/1985 | Schumacher | 99/483 |
| 4,536,643 | 8/1985 | Erickson | 219/400 |
| 4,619,053 | 10/1986 | Schumacher | 99/483 |

Primary Examiner—Timothy F. Simone
Attorney, Agent, or Firm—Bacon & Thomas

[57] ABSTRACT

A vegetable dehydrator has a base unit of a bow shape adapted to rest a whirlwind unit therein and a tray which is not limited in one, sitting on top thereon and capped by a cap. The whirlwind unit includes an upper and a lower air inlets which are passage for air sucked in by a fan both from outwardly and inwardly, a heating element located therein to raise temperature of air therein. The tray has a plurality of apertures at bottom portion for air to flow therethrough, a plurality of cut-off portions at outside surface of the tray. Each cut-off portion includes a number of notches which is to be engaged with protuberances extending outwardly from the other tray that put on top of the tray. Adjusting knob is provided on the cap so as to adjust warm air to be blown out therefrom.

1 Claim, 5 Drawing Sheets

VEGETABLE DEHYDRATOR

FIELD OF THE INVENTION

This invention relates to a dehydrator. More particularly a dehydrator adapted to dehydrated vegetables in order to be preserved for a longer period.

BACKGROUND OF THE INVENTION

For many years people dry their vegetables and fruits so as to keep those vegetables for a longer period of time. The method that has been utilized is to leave vegetables or fruits at place attached on a surface. The vegetables are likely to be rotten before dehydrated.

A food dehydration device was developed which utilizes warm air to dry vegetables by blowing warm air dissipated from electric wire located at bottom portion of the device. However, such an arrangement may easily dry and shrink.

SUMMARY OF THE INVENTION

Accordingly, the primary object of the present invention to provide a vegetable dehydrator which saves energy.

It is another object of the present invention to provide a vegetable dehydrator which capacity is flexible.

It is a further object of the present invention to provide a vegetable dehydrator which is easy to operate.

It is still a further object of the present invention to provide a vegetable dehydrator which is inexpensive to manufacture.

DETAILED DESCRIPTION OF THE PREFERRED EMBODIMENT

Figure 1:
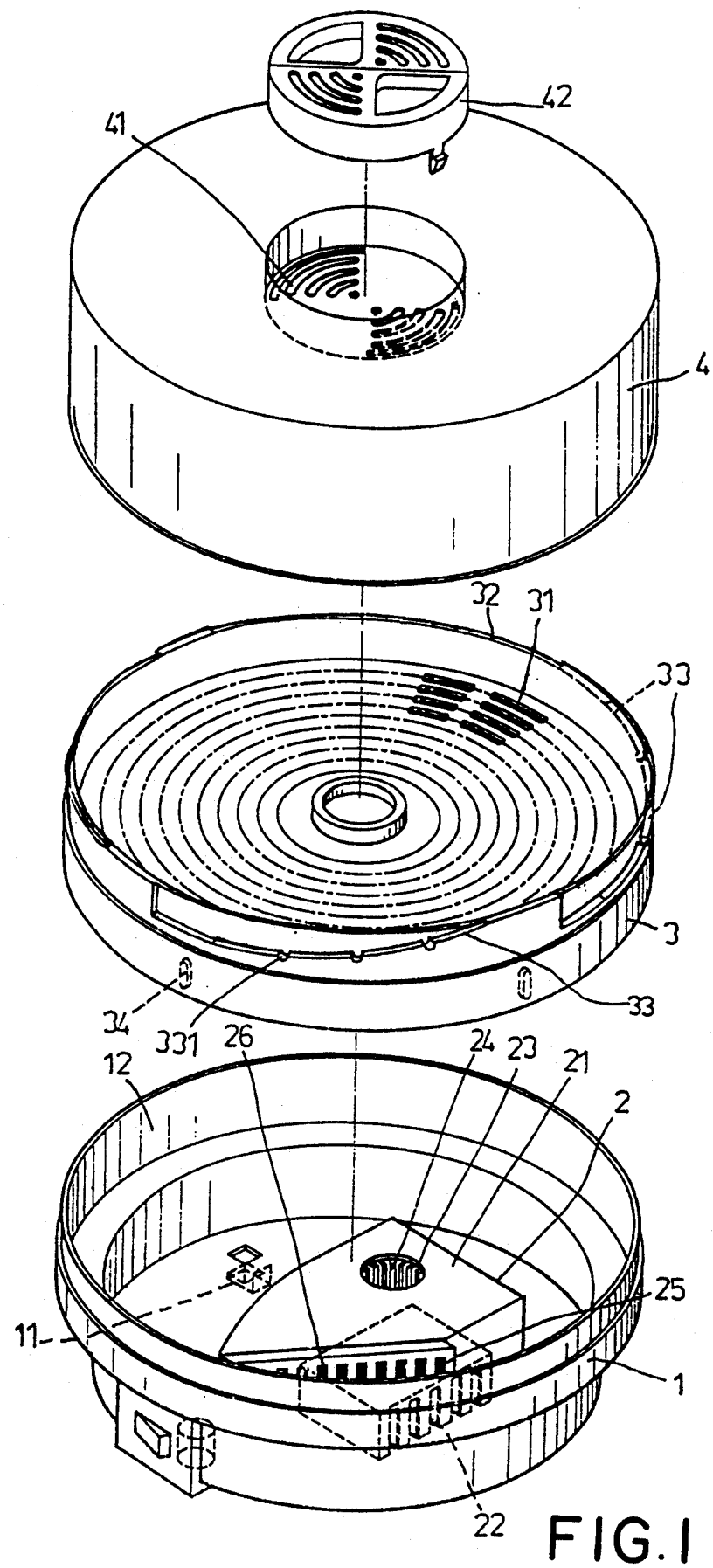
FIG. 1 is a fragmentary view of the present invention.
Figure 2:
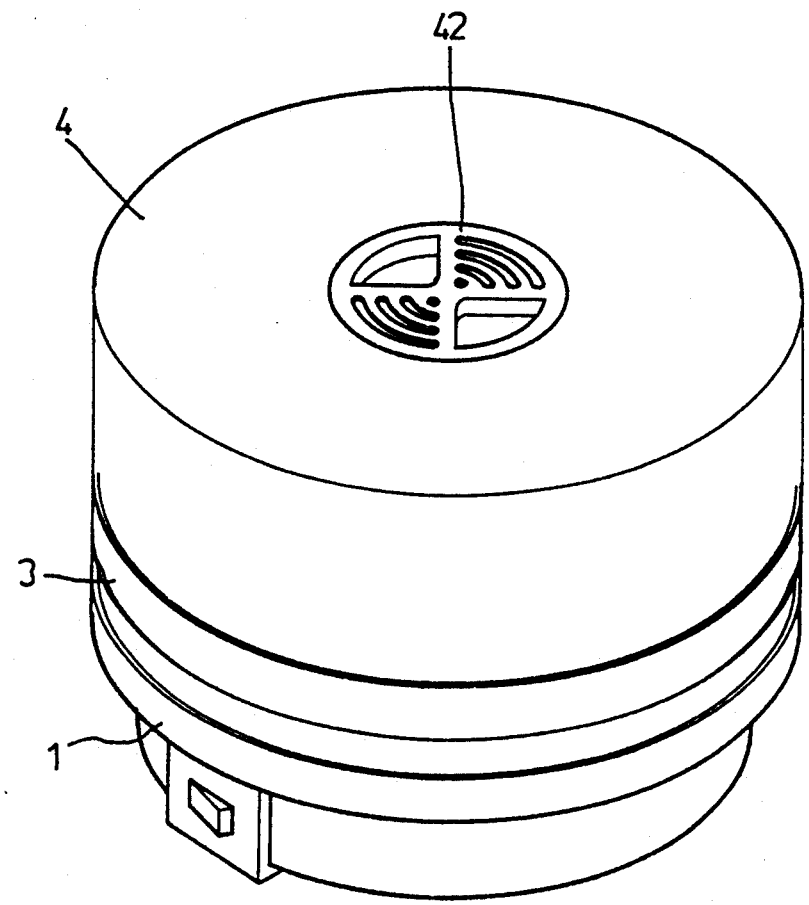
FIG. 2 is a perspective view of FIG. 1.
Figure 3:
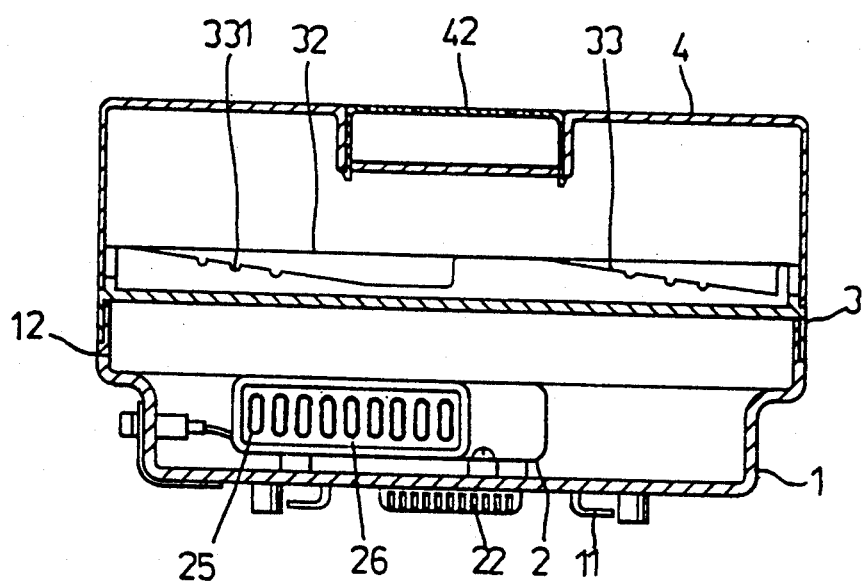
FIG. 3 is a side elevational view of FIG. 2, partially sectioned.
Figure 4:
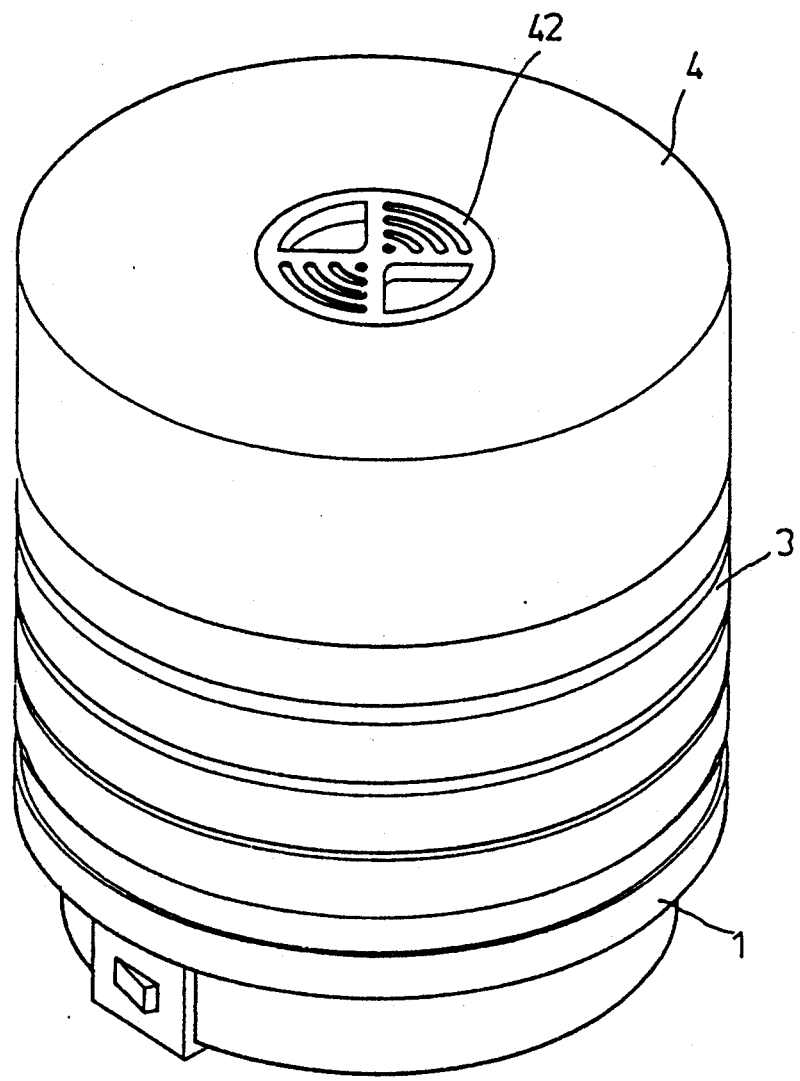
FIG. 4 is a further perspective view of FIG. 1, having a plurality of trays adapted.
Figure 5:
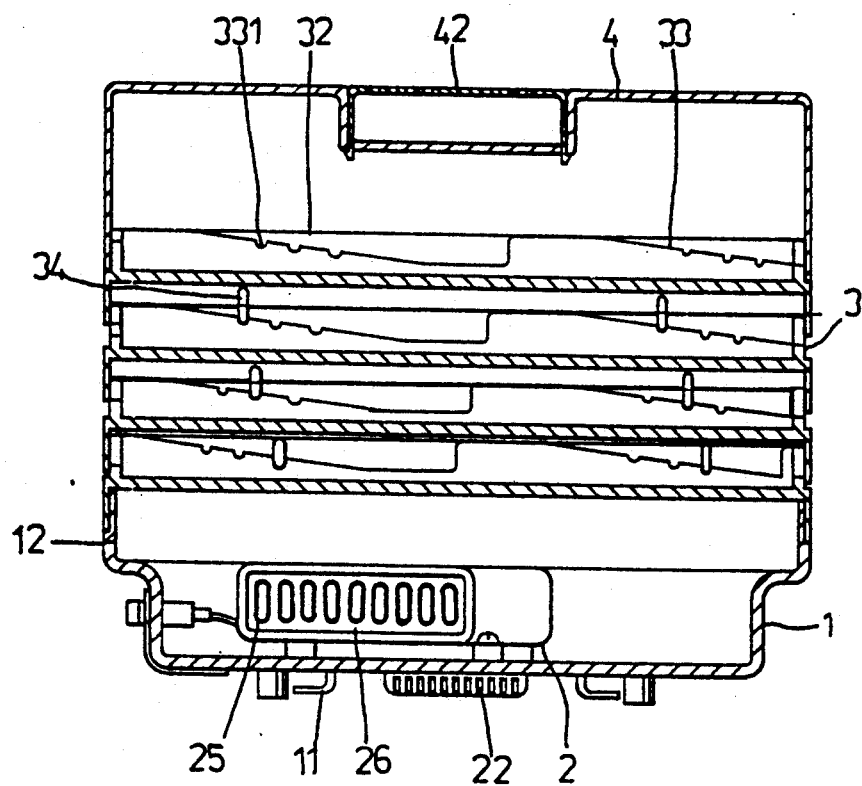
FIG. 5 is a side elevational view of FIG. 4, partially sectioned.

Referring now to the drawing wherein the showings are for the purposes of illustrating a preferred embodiment of the invention only and not for the purposes of limiting the same. FIG. 1 shows the present invention composed essentially of a base unit 1, a whirlwind unit 2, a plurality of trays 3, and a cap 4.

The base unit 1 is generally a round plate having a plurality of wire posts 11 adapted to hold electric wire, a rim 12 extending circumferentially upward around the edge.

The whirlwind unit 2 is located in the center of the base unit 1 and has a lower inlet 22 facing downward and breaking through the bottom skin of the base unit 1, a housing 21 having an upper inlet 23, a fan 24 located inbetween the upper and the lower inlets 23, 22, a heating element 25 located within the housing 21 and a plurality of apertures 26 as wind outlet for warm air blows out therefrom.

The tray 3, since the construction of every tray is identical, a description of one will be surfaced for both, has a plurality of apertures 31 at bottom portion for air to flow, a number of cut-off portions at outward surface of the wall in slanting manner from top 32 halfway to the bottom and having formed a plurality of notches 331. A plurality of protuberances 34 extending outwardly adapted to be engaged with the notches 331 to form layers when more than one tray is required simply put each tray 3 on top of the other and secured by means of the notches 331 and the protuberances 34.

The cap 4 has grid apertures 41 at top as air outlet and is controlled by a knob 42 to adjust the volume of air blows out from the apertures 41.

It is to be noted that warm air blown out from the center portion of the tray 3 and reuse which saves energy. Furthermore, other than the function of dehydrated vegetables and fruits, the temperature of the heating element 25 may be adjusted to a high position so as to dehydrate foods for longer preservative times.

I claim:
1. A vegetable dehydrator comprising:
   a base unit shaped like a bow having at least three wire posts adapted to hold electric wire at place, a whirlwind unit located at center portion thereof;
   said whirlwind unit having an upper and a lower air inlets to suck air from outside of said base unit and from top within said base unit, a fan to suck air from outside, a heating element to produce warm air and to blow out from an outlet;
   at least two trays each having cut-off portions at outside surface of said tray slanting downward from top portion to halfway down to the bottom portion and including notches and protuberances adapted to be engaged with said notches to secur said tray at place;
   a cap having an adjusting knob at top adapted to adjust warm air to be blown out therefrom.

* * * * *